United States Patent
Noh (10) Patent No.: US 11,134,307 B2
(45) Date of Patent: Sep. 28, 2021

(54) IMAGE PROCESSING APPARATUS AND CONTROL METHOD THEREOF

(71) Applicant: Samsung Electronics Co., Ltd., Suwon-si (KR)

(72) Inventor: Sungho Noh, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/211,825

(22) Filed: Dec. 6, 2018

(65) Prior Publication Data
US 2019/0182538 A1  Jun. 13, 2019

(30) Foreign Application Priority Data

Dec. 8, 2017  (KR) .................. 10-2017-0168644

(51) Int. Cl.
| | |
|---|---|
| *H04N 21/4405* | (2011.01) |
| *H04N 21/266* | (2011.01) |
| *H04N 21/435* | (2011.01) |
| *H04N 21/472* | (2011.01) |
| *H04N 21/433* | (2011.01) |
| *H04N 21/426* | (2011.01) |

(52) U.S. Cl.
CPC ... *H04N 21/4405* (2013.01); *H04N 21/26613* (2013.01); *H04N 21/42623* (2013.01); *H04N 21/4334* (2013.01); *H04N 21/4353* (2013.01); *H04N 21/47217* (2013.01)

(58) Field of Classification Search
None
See application file for complete search history.

(56) References Cited

U.S. PATENT DOCUMENTS

| | | | |
|---|---|---|---|
| 2004/0001693 A1* | 1/2004 | Cavallerano | H04N 21/4325 386/241 |
| 2006/0039560 A1* | 2/2006 | Wasilewski | G11B 20/00282 380/228 |
| 2008/0273698 A1* | 11/2008 | Manders | H04N 5/783 380/200 |
| 2014/0226814 A1* | 8/2014 | Fernando | H04N 21/4405 380/200 |
| 2015/0249861 A1 | 9/2015 | Kim et al. | |

* cited by examiner

*Primary Examiner* — Omar S Parra
(74) *Attorney, Agent, or Firm* — Staas & Halsey LLP (57) ABSTRACT

An image processing apparatus includes a storage, a receiver configured to receive a transport stream from a source device, and a processor. According to an aspect, the processor is configured to decrypt encrypted content data obtained from the transport stream received by the receiver, generate index information based on the decrypted content data where the index information generated includes at least one reference corresponding to the encrypted content data to be referenced to display an image of the content data, and store the encrypted content data in association with the index information in the storage.

20 Claims, 9 Drawing Sheets

IMAGE PROCESSING APPARATUS AND CONTROL METHOD THEREOF

CROSS-REFERENCE TO RELATED THE APPLICATION

This application is based on and claims priority under 35 U.S.C. § 119 to Korean Patent Application No. 10-2017-0168644, filed on Dec. 8, 2017 in the Korean Intellectual Property Office, the disclosure of which is incorporated by reference herein in its entirety.

BACKGROUND

Field

The disclosure relates to an image processing apparatus, which receives content data from an external source and processes the content data to be displayed, and a control method thereof, and more particularly to an image processing apparatus and a control method thereof, which are related to technology for storing content data received from an external source when the content data is encrypted for security and controlling access to content data.

Description of the Related Art

An image processing apparatus comprehensively refers to an apparatus that applies an image processing process to content data extracted from a transport stream when the transport stream including the content data is received from an external source, thereby making an image based on the content data to be displayed. The image processing apparatus is broadly classified into two types according to whether or not it can autonomously display an image. As an example of the image processing apparatus that cannot autonomously display an image, there is a set-top box. In this case, the image processing apparatus transmits the content data to the outside so that the image can be displayed on another apparatus. On the other hand, the image processing apparatus capable of autonomously displaying an image is materialized by a display apparatus including a display panel, the most representative example of which is a television (TV).

In terms of providing content data to the image processing apparatus, a content provider establishes a predetermined source device and transmits a transport stream including the content data from the source device to the image processing apparatus. In this case, the content data in the transport stream may be encrypted by reflecting intention or a security policy that the content provider of providing content or a content creator of creating content has. Such encryption of content data in a transport stream is to prevent content from leaking out to an unauthorized third party. When the image processing apparatus acquires encrypted content data from a transport stream received from a source device, the image processing apparatus decrypts the content data through a previously designated decryption process and decodes the decrypted content data to be displayed as an image.

For convenience of a user, the image processing apparatus may support a personal video recording (PVR) function for storing content data as well as a basic function of displaying an image based on the content data. For example, when a transport stream is received from a source device, the image processing apparatus stores the content data of the transport stream in a storage while decrypting and decoding the content data. In the future, the image processing apparatus reads and reproduces the stored content data from the storage without receiving the transport stream again from the source device, thereby displaying an image based on the content data.

However, the encrypted content data in the transport stream may cause a problem in carrying out the PVR function. Conventionally, the image processing apparatus decrypts the content data, and stores the decrypted content data in the storage. In this case, clean content data is present in the image processing apparatus, and thus there is a risk of leaking content through the image processing apparatus. Such a case may violate the security policy of the content provider.

Accordingly, the image processing apparatus may be required to store content data without violating the security policy, while supporting the PVR function for a user's convenience.

SUMMARY

In accordance with an aspect of the disclosure, there is provided an image processing apparatus including: a storage; a receiver configured to receive a transport stream from a source device; and a processor. The processor is configured to: decrypt encrypted content data obtained from the transport stream received by the receiver, generate index information based on the decrypted content data, where the index information is generated to include at least one reference corresponding to the encrypted content data to be referenced to display an image of the content data, and store the encrypted content data in the storage in association with the index information. Thus, the image processing apparatus does not violate a security policy of a content provider since content is prevented from being leaked to the outside while content data is stored for a user's convenience.

The at least one reference included in the index information may indicate a location of the encrypted content data corresponding to a scene requested to be displayed by a searching operation related to the content data.

The at least one reference included in the index information may include identification information of an index frame of the scene, where the index frame has a preset attribute among a plurality of image frames, and the processor may retrieve location information of the location of the scene in the encrypted content data corresponding to the index frame, and process data corresponding to the retrieved location information to be displayable.

The preset attribute of the index frame may include an Intra-picture image frame.

The processor may obtain data corresponding to the retrieved location information by identifying a data code corresponding to the identification information of the index frame among data codes of the encrypted content data.

The processor may encrypt the decrypted content data again with an encryption algorithm applied to the content data by the source device when the transport stream is generated, and stores the encrypted content data in the storage.

The image processing apparatus may further include a communicator configured to communicate with a server that stores a plurality of keys given for respectively decrypting data corresponding to a plurality of sections of the encrypted content data, wherein the processor may obtain a key corresponding to decryption for a section among the plurality of sections of the encrypted content data from the server, based on information about an address in which the plurality of keys are stored.

The processor may cause the information about the address and the encrypted content data stored in the storage be transmitted to an external apparatus through the communicator so that the image is displayable by the external apparatus.

A method of controlling an image processing apparatus, the method including: receiving a transport stream; obtaining encrypted content data from the transport stream, and decrypting the encrypted content data; and generating index information based on the decrypted content data, the index information being generated to include at least one reference corresponding to the encrypted content data to be referenced to display an image of the content data, and storing the encrypted content data in association with the index information.

The at least one reference included in the index information may indicate a location of the encrypted content data corresponding to a scene requested to be displayed by a searching operation related to the content data.

The at least one reference included in the index information may include identification information of an index frame of the scene, where the index frame has a preset attribute among a plurality of image frames, and the method may further includes retrieving location information of the location of the scene in the encrypted content data corresponding to the index frame, and processing data corresponding to the retrieved location information to be displayable.

The preset attribute of the index frame may include an Intra-picture image frame.

The processing of the data corresponding to the retrieved location information to be displayable may include obtaining data corresponding to the retrieved location information by identifying a data code corresponding to the identification information of the index frame among data codes of the encrypted content data.

The storing of the encrypted content data and the index information may include encrypting the decrypted content data again with an encryption algorithm applied to the content data by a source device when the transport stream is generated, and storing the encrypted content data.

The method may further include communicating with a server that stores a plurality of keys given for respectively decrypting data corresponding to a plurality of sections of the encrypted content data, and obtaining a key corresponding to decryption for a section among the plurality of sections of the encrypted content data from the server, based on information about an address in which the plurality of keys are stored.

The method may further include transmitting the information about the stored encrypted content data and the address information to an external apparatus through the communicator so that the image is displayable by the external apparatus.

A nonvolatile computer-readable recording medium storing a program which when executed by a processor of an image processing apparatus executes an operation including: receiving a transport stream; obtaining encrypted content data from the transport stream, and decrypting the encrypted content data; and generating index information based on the decrypted content data, the index information being generated to include at least one reference corresponding to the encrypted content data to be referenced to display an image of the content data, and storing the encrypted content data in association with the index information.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF EXEMPLARY EMBODIMENTS

Below, exemplary embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these embodiments may be discretionally selected and applied to realize the present inventive concept by a person having an ordinary skill in the art.

It will be understood that, although the terms first, second, etc. may be used herein to describe various elements, these elements should not be limited by these terms but only be used to distinguish one element to one element from another. The terms set forth herein are applied for describing the exemplary embodiments without departing from the scope of the present disclosure.

Further, "at least one" among a plurality of elements in the present disclosure represents not only all the plurality of elements but also each individual element excluding the other elements from the plurality of elements or all combinations thereof.

Figure 1:
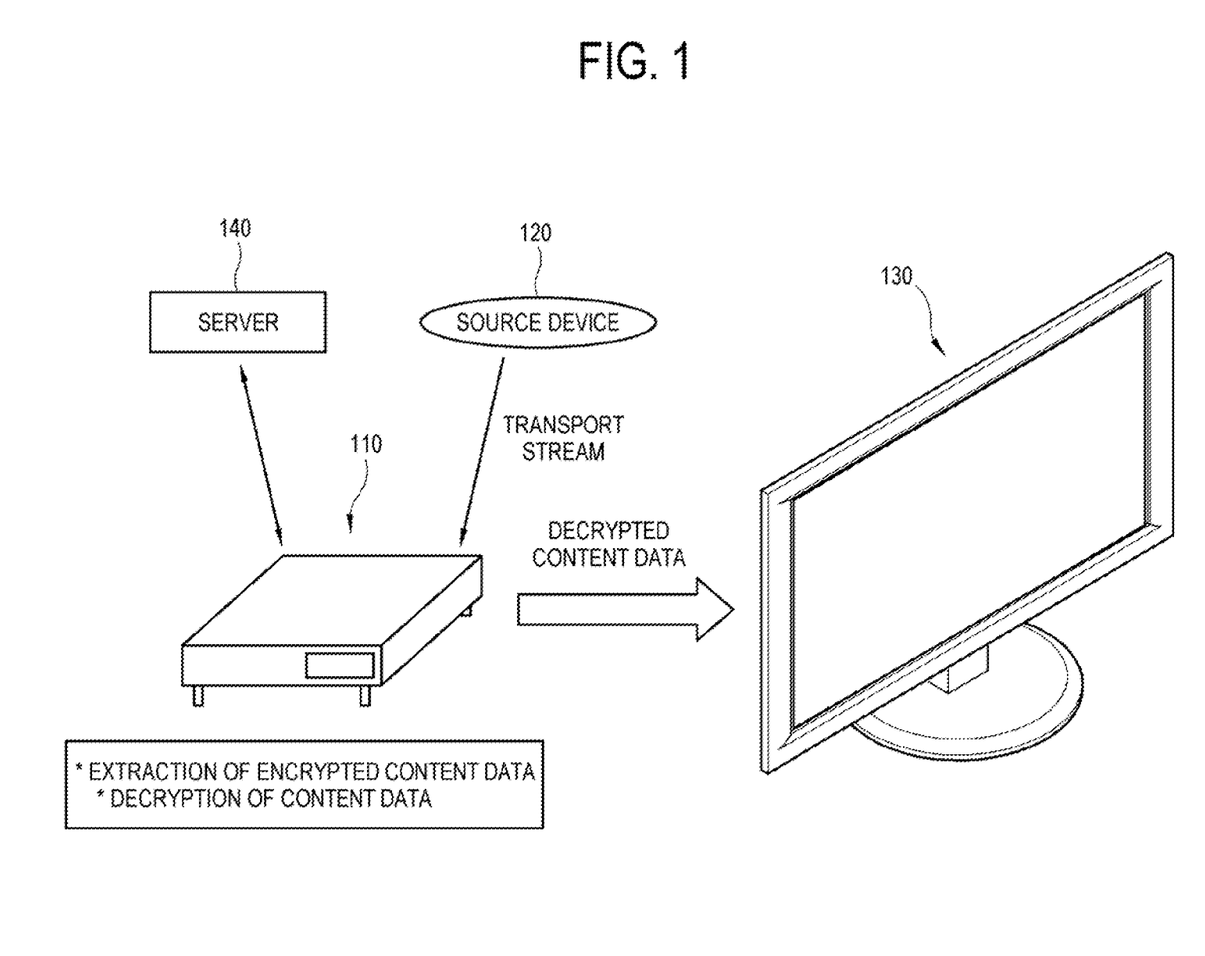
FIG. 1 illustrates an example that an image processing apparatus according to one exemplary embodiment receives a transport stream from a source device and processes the transport stream to be displayed as an image.

FIG. 1 illustrates an example that an image processing apparatus according to one exemplary embodiment receives a transport stream from a source device and processes the transport stream to be displayed as an image.

As shown in FIG. 1, an image processing apparatus 110 according to one exemplary embodiment is capable of receiving a transport stream from a predetermined source device 120, and outputting content data obtained by processing the transport stream to a display apparatus 130 so that the display apparatus 130 can display an image based on the content image. The image processing apparatus 110 according to an exemplary embodiment is materialized by a set-top box, but the present inventive concept is not limited to this exemplary embodiment. For example, the present inventive concept may be materialized by the display apparatus 130 in the present system, or a display apparatus 130 that receives a transport stream from the source device 120 without the image processing apparatus 110.

The image processing apparatus 110 receives a transport stream from the source device 120. When the source device 120 is a streaming server, a transport stream is streamed to the image processing apparatus 110 by a broadband method. Alternatively, when the source device 120 is a transmitter of a broadcasting station, a transport stream is transmitted as a terrestrial wave to the image processing apparatus 100 by a broadcast method. Further, the image processing apparatus 110 may communicate with various servers 140 on a network.

The image processing apparatus 110 receives a transport stream and extracts content data from the transport stream. The content data refers to data for displaying a content image, and includes video data, audio data, appended data, etc. Here, the source device 120 may encrypt the content data in the transport stream for security, and the image processing apparatus 110 may use a previously designated decryption algorithm to decrypt the encrypted content data into clean content data. The clean content data refers to the decrypted content data.

The decryption algorithm may for example include a procedure of making the image processing apparatus 110 receive a decryption key from the server 140 that has the decryption key, and then use the received decryption key to decrypt the content data. The image processing apparatus 110 processes the decrypted content data through the decryption algorithm to thereby display a content image. Meanwhile, such a decryption algorithm is required even when a trick play operation is performed. Detailed descriptions about the trick play operation will be made later.

The image processing apparatus 110 outputs the clean content data to the display apparatus 130, so that the display apparatus 130 can display a content image based on the clean content data. The image processing apparatus 110 performs decoding, scaling, and the like image processing process before outputting the clean content data. Alternatively, the display apparatus 130 may perform the image processing process with regard to the clean content data output from the image processing apparatus 110.

Meanwhile, the image processing apparatus 110 may store the content data. The image processing apparatus 110 may store the content data in response to a user's input or in response to various events such as scheduled recording. When the content data is storable in the image processing apparatus 110, the image processing apparatus 110 can display the content image without receiving the content data again from the source device 120.

The image processing apparatus 110 encrypts and stores the decrypted content data. In this case, the image processing apparatus 110 employs the same algorithm as that used when the source device 120 first encrypts the content data. That is, both the content data encrypted by the source device 120 and contained in the transport stream and the content data encrypted again by and stored in the image processing apparatus 110 are subjected to one encryption algorithm.

When the image processing apparatus 110 stores the clean content data without encrypting the decrypted content data again, there is a high risk of content leakage from the image processing apparatus 110. Meanwhile, when the image processing apparatus 110 employs an algorithm different from the encryption algorithm of the source device 120, it violates the security policy of the content provider, and needs a separate decryption process when the stored content data is decrypted in the future.

According to the present exemplary embodiment, the image processing apparatus 110 stores the content data encrypted again by the encryption algorithm of the source device 120, and is thus convenient for a user without violating the security policy of the content provider.

Below, the hardware configuration of the image processing apparatus 110 will be described.

Figure 2:
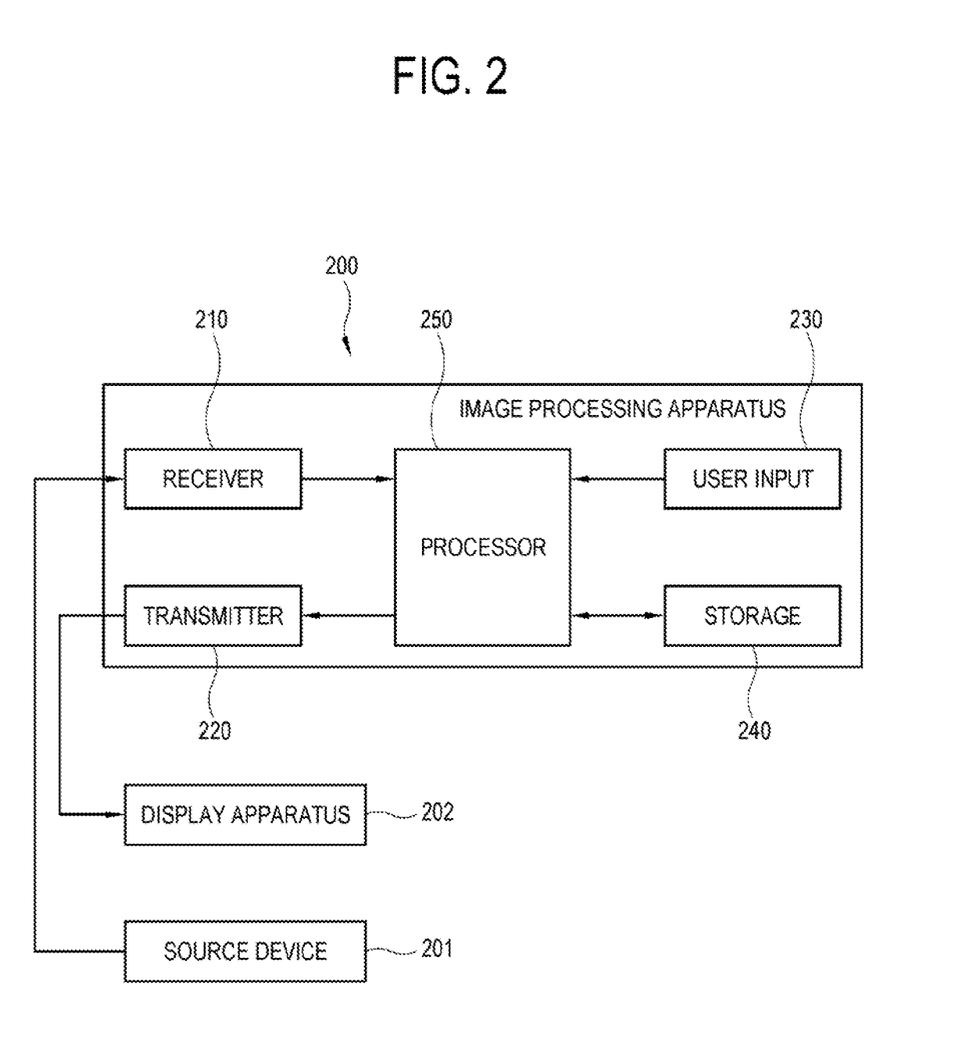
FIG. 2 is a block diagram of an image processing apparatus according to one exemplary embodiment.

FIG. 2 is a block diagram of an image processing apparatus according to one exemplary embodiment.

As shown in FIG. 2, an image processing apparatus 200 includes a receiver 210 for receiving a predetermined signal from a source device 201, a transmitter 220 for transmitting a predetermined signal to a display apparatus 202, a user input 230 for executing a user's input operation, a storage 240 for storing data, and at least one processor 250 for executing calculation for operations of the image processing apparatus 200. In this exemplary embodiment, the image processing apparatus 200 does not include a display for displaying an image. However, the present inventive concept may be applied to the image processing apparatus 200 designed to include the display.

The receiver 210 receives a transport stream from the source device 201. When the image processing apparatus 200 is materialized by a set-top box or a TV, the receiver 210 may include a tuner for selectively receiving a broadcast signal. The image processing apparatus 200 may further include a communicator capable of interactively communicating with an external apparatus. When interactive communication is needed in receiving the transport stream, the communicator may receive the transport stream from the source device 201. Meanwhile, the communicator may transmit and receive data or information needed for operation while communicating with the server. The communicator refers to a communication circuit materialized by combination of a communication port, a communication module, and a communication chip in accordance with various communication standards, and there are no limits to a supportable communication protocol. For example, the communicator may include a radio frequency integrated circuit (RFIC) for receiving an RF signal, a wireless communication module for wireless network communication, an Ethernet module for wired network communication, a connection port for connection with an external memory, etc.

The transmitter 220 transmits content data to the display apparatus 202 in accordance with various transmission standards. The transmitter 220 may for example transmit the content data to the display apparatus 202 through a high definition multimedia interface (HDMI) cable.

The user input 230 generates a preset command or information in response to a user's control or input and transmits the preset command or information to the processor 250. The user input 230 may be achieved in various types according to a user's input environments, for example, and may for example include a button provided at an outer side of the display apparatus 202, a touch pad, a touch screen, a remote controller separated from the main body of the display apparatus 202, etc. Alternatively, the user input 230 may be achieved by an application that provides a user input interface to be executed in a mobile apparatus, and in this case a user input signal from a mobile apparatus may be received in the image processing apparatus 200.

The storage 240 is configured to store data in accordance with processes and control of the processor 250. The data to be stored in the storage 240 is subjected to reading, recording, modifying, updating, etc. by the processor 250. The storage 240 may be broadly classified into two types, i.e. volatile and nonvolatile memories. The image processing apparatus 200 may include both two types of the storage 240. As a nonvolatile memory in which data is retained even when power is off, the storage 240 includes a flash memory, a hard-disc drive (HDD), a solid-state drive (SSD), etc. Likewise, as a volatile memory in which data is deleted when power is off, the storage 240 includes a random-access memory (RAM), a read-only memory (ROM), a buffer, etc.

The processor 250 includes a hardware calculation circuit materialized by a central processing unit (CPU), a microprocessor, a chipset, or the like mounted on a printed circuit board, and may alternately be designed as a system on chip (SOC). The processor 250 includes modules corresponding to various processes such as a demultiplexer, a decoder, a scaler, an audio digital signal processor (DSP), an amplifier, etc., and some of them may be materialized by the SOC. For example, the demultiplexer, the decoder, the scaler and the like modules related to image processing may be materialized by an image processing SOC, and the audio DSP may be materialized by a chipset separated from the SOC.

When a transport stream is received in the receiver 210, the processor 250 acquires encrypted content data from the transport stream, decrypts the content data by the decryption algorithm, and transmits the decrypted content data to the display apparatus 202 via the transmitter 220. Thus, the display apparatus 202 displays a content image based on the decrypted content data.

Further, the processor 250 according to one exemplary embodiment encrypts the decrypted content data again by the encryption algorithm that the source device 201 has, and stores the re-encrypted content data in the storage 240. Thereafter, when a preset event such as an indication made by a user input occurs through the user input 230, the processor 250 reads and decrypts the encrypted content data stored in the storage 240, and transmits the decrypted content data to the display apparatus 202 through the transmitter 220.

By the way, a user may want to make a trick play with regard to such stored content. The trick play refers to various searching operations of a user with regard to a scene of content, and includes a play, a stop, a forward play, a backward play, an image frame skip by a predetermined unit time, etc. from the scene at a predetermined point in time of the content. Typically, such a trick play is performed with respect to the decrypted content data. On the other hand, the image processing apparatus according to one exemplary embodiment operates as follows.

Figure 3:
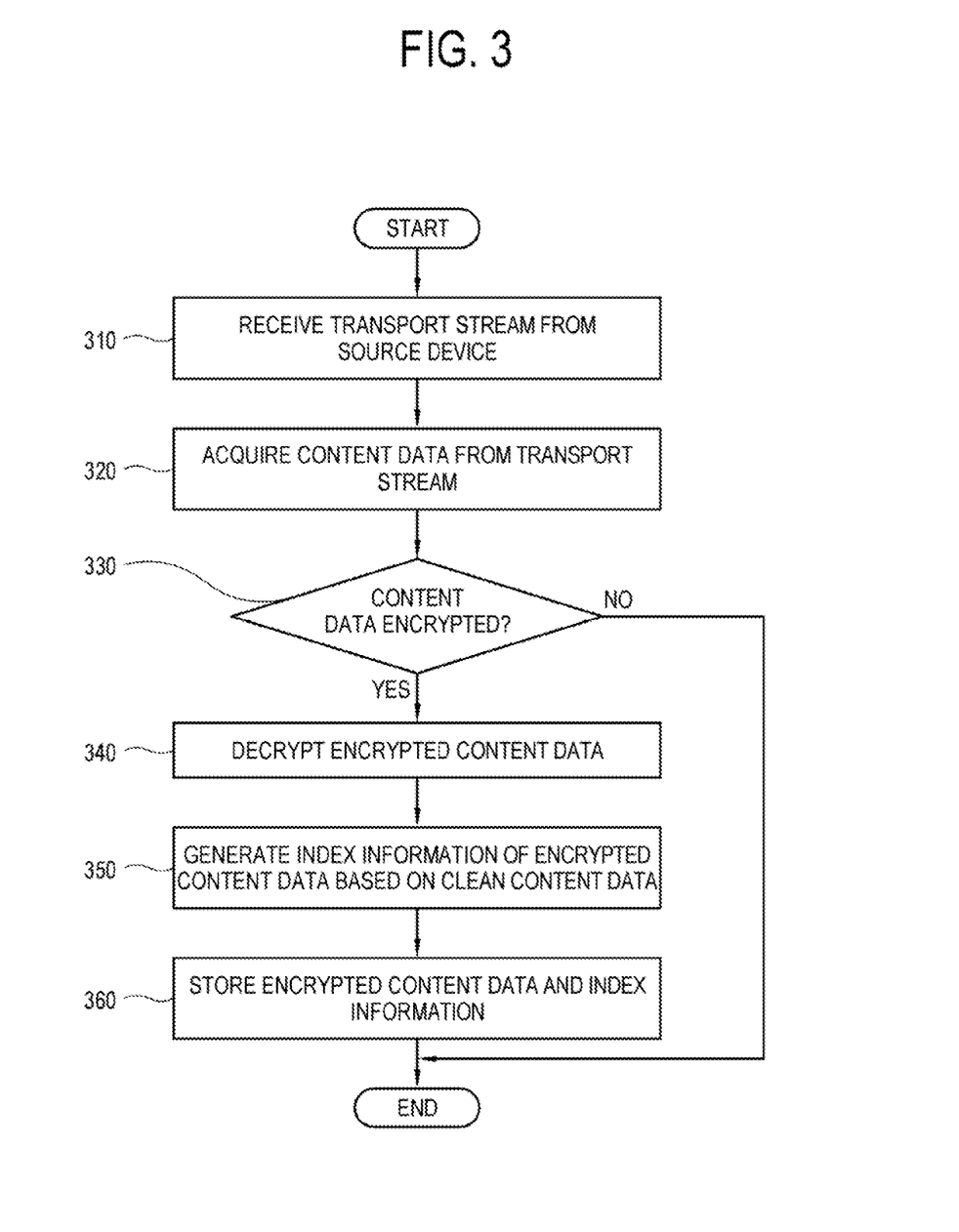
FIG. 3 is a flowchart of controlling an image processing apparatus according to one exemplary embodiment to store content data of a received transport stream.

FIG. 3 is a flowchart of controlling an image processing apparatus according to one exemplary embodiment to store content data of a received transport stream.

As shown in FIG. 3, the image processing apparatus carries out the following operations by the processor.

At operation 310 an image processing apparatus receives a transport stream from a source device.

At operation 320 the image processing apparatus acquires content data from the transport stream.

At operation 330 the image processing apparatus determines whether the acquired content data has been encrypted.

When it is determined that the encrypted content data is acquired, at operation 340 the image processing apparatus decrypts the encrypted content data.

At operation 350 the image processing apparatus generates index information of the encrypted content data to be referred for displaying a content image, based on decrypted clean content data. The index information indicates a location of data, which corresponds to a scene in response to a searching operation to the content data, within the encrypted content data.

At operation 360 the image processing apparatus stores the encrypted content data and the index information. Here, the stored content data is encrypted, but the index information is not encrypted.

In addition, the image processing apparatus may process the clean content data to be displayed as an image after storing the index information. For example, in a case of scheduled recording, the image processing apparatus stores the encrypted content data, but does not perform a process for displaying the content image.

Like this, the image processing apparatus generates and stores the index information from the decrypted content data, in which the index information is generated corresponding to not the clean content data but the encrypted content data. In this regard, detailed descriptions will be made later.

Below, it will be described that the image processing apparatus, in which the encrypted content data and the index information have been stored, operates in response to a user's input about the trick play.

Figure 4:
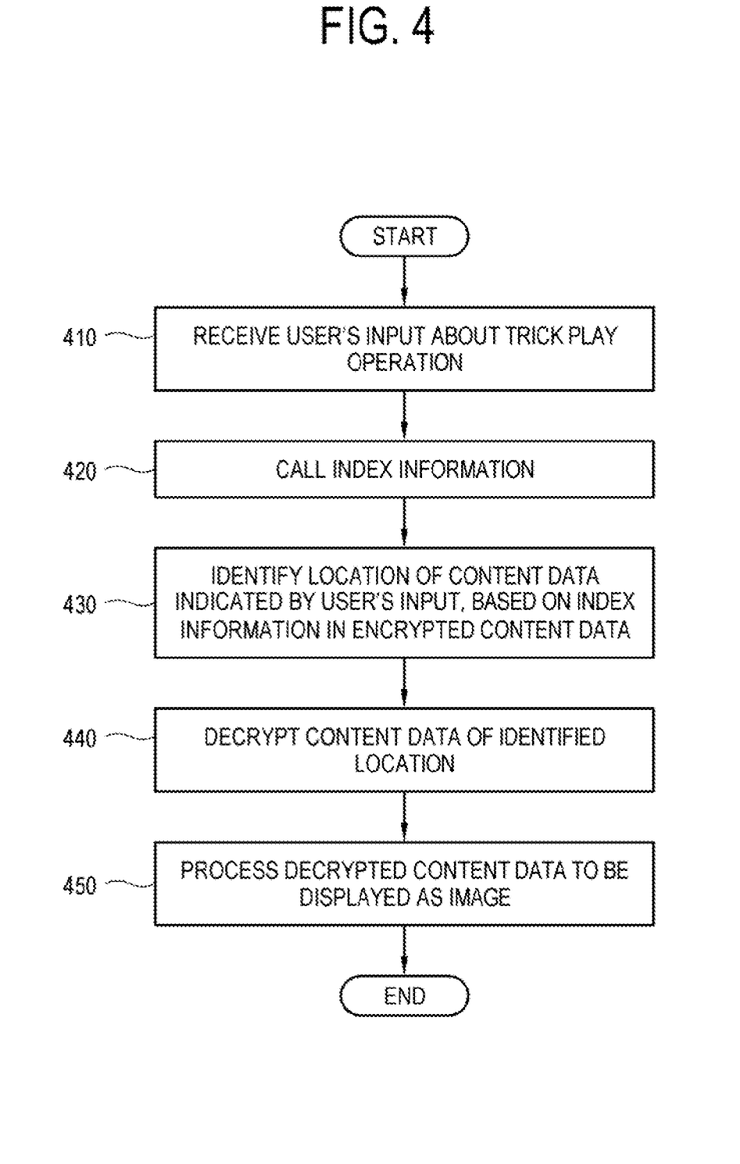
FIG. 4 is a flowchart of controlling an image processing apparatus according to one exemplary embodiment to process recorded and stored content data in response to a trick play input.

FIG. 4 is a flowchart of controlling an image processing apparatus according to one exemplary embodiment to process recorded and stored content data in response to a trick play input.

As shown in FIG. 4, the image processing apparatus performs the following operations by the processor.

At operation 410 the image processing apparatus receives a user's input about a trick play operation with regard to previously-stored encrypted-content data.

At operation 420 the image processing apparatus calls the index information about the encrypted content data.

At operation 430 the image processing apparatus determines the location of the content data indicated by a user's input based on the index information within the encrypted content data.

At operation 440 the image processing apparatus decrypts the content data corresponding to the determined location.

At operation 450 the image processing apparatus processes the decrypted content data to be displayed as an image.

Like this, the image processing apparatus determines and processes only a part of content data corresponding to a scene indicated by a trick play without fully decrypting the previously-stored encrypted-content data in response to the trick play, thereby quickly carrying out a trick play operation.

Basically, a decryption key may be used in the method of decrypting the encrypted content data. Besides, there may be many ways. Below, one exemplary embodiment of decrypting the encrypted content data will be described.

Figure 5:
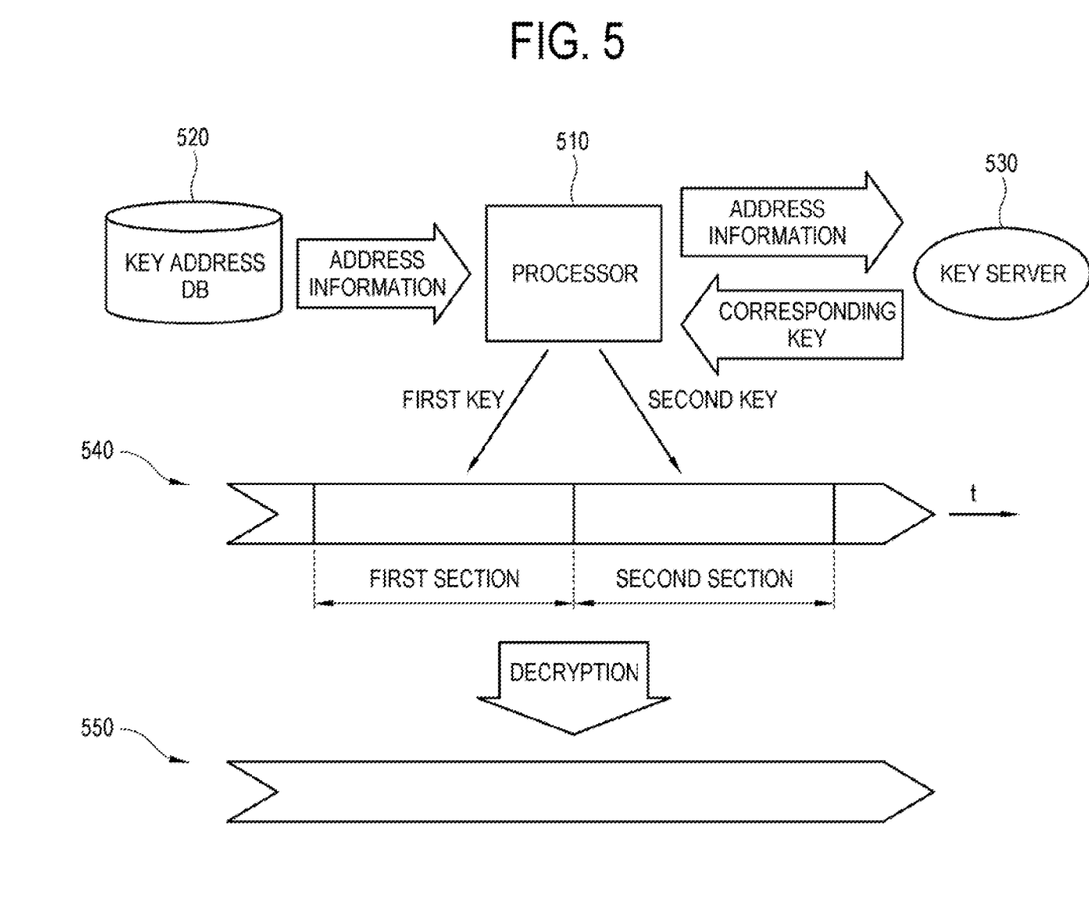
FIG. 5 illustrates an example of a principle that an image processing apparatus according to one exemplary embodiment decrypts encrypted content data.

FIG. 5 illustrates an example of a principle that an image processing apparatus according to one exemplary embodiment decrypts encrypted content data.

As shown in FIG. 5, a processor 510 of an image processing apparatus acquires a key address DB 520 to decrypt encrypted content data 540. The key address DB 520 refers to data, which is also called a manifest file, and acquired from a content provider. The key address DB 520 includes address information about a key server 530 from which a key for decryption is acquirable. That is, the key address DB 520 does not store the decryption key itself, but records a uniform resource locator (URL) of the key server 530 to acquire the decryption key.

There are many ways of using the key to decrypt the encrypted content data 540. For example, a single key may be given corresponding to one piece of content. In this case the processor 510 acquires the single key and decrypts the whole encrypted content data 540 with the acquired single key.

Alternatively, a plurality of keys may be given corresponding to a plurality of sections divided by the time t of the encrypted content data 540. That is, a key given corresponding to a predetermined first section of the encrypted content data 540 is needed to decrypt the first section, and it is impossible to decrypt the first section by a key given corresponding to a second section. In this case, the key server 530 stores the plurality of keys respectively corresponding to the sections.

The processor 510 acquires address information of the key, which corresponds to the first section of the encrypted content data 540, from the key address DB 520. The processor 510 accesses the key server 530 with the acquired address information, and receives a first key corresponding to the first section from the address information. The processor 510 decrypts the first section of the encrypted content data 540 by the first key. Likewise, the processor 510 receives a second key corresponding to the second section of the encrypted content data 540, and decrypts the second section with the second key. In this manner, the processor 510 decrypts the encrypted content data 540 into clean content data 550.

When the trick play is performed, the processor 510 determines the location of the content data matching with the scene according to the trick play within the encrypted content data 540. Such determination may be performed based on the index information as described above. The processor 510 obtains the address information corresponding to the determined location of the content data from the key address DB 520, and receives the key corresponding to the obtained address information from the key server 530, thereby decrypting the content data at the corresponding location.

Meanwhile, the index information provides pieces of information that makes an image frame of a scene indicated by a trick play be specified and extracted from the encrypted content data 540, without fully decrypting the encrypted content data 540. In accordance with workshop modifications, various changes can be made in what information the index information involves and how the index information is configured, without limitations. Below, one example of the index information will be described.

Figure 6:
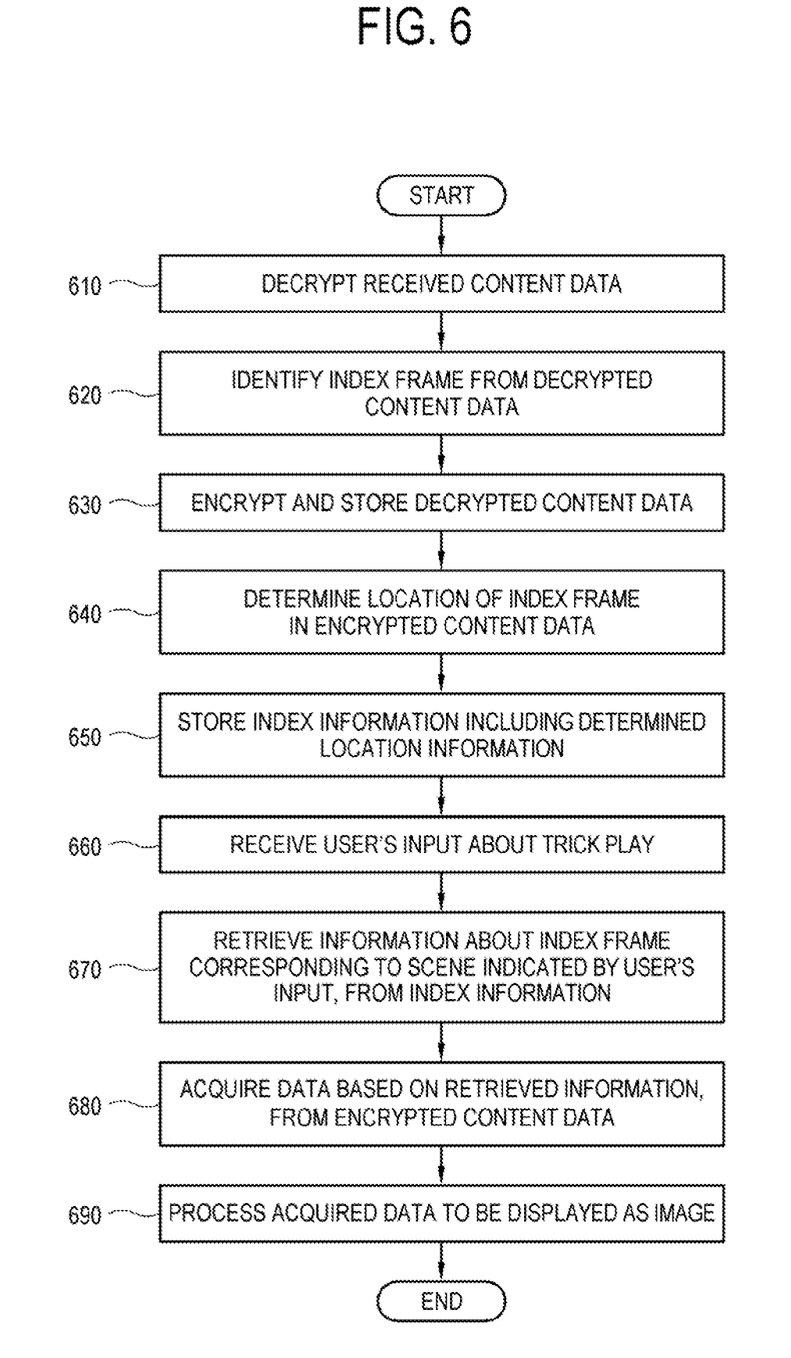
FIG. 6 is a flowchart of controlling an image processing apparatus according to one exemplary embodiment to generate index information and perform a trick play operation based on the index information.

FIG. 6 is a flowchart of controlling an image processing apparatus according to one exemplary embodiment to generate index information and perform a trick play operation based on the index information.

As shown in FIG. 6, the image processing apparatus performs the following operations by the processor.

At operation 610 the image processing apparatus decrypts the received encrypted content data. In this case, the image processing apparatus may process the decrypted content data to be displayed as an image, or may not perform the process for displaying the image in a case of scheduled recording.

At operation 620 the image processing apparatus determines a key frame or an index frame as a criterion for a searching operation in the decrypted content data. Detailed descriptions about the index frame will be made later.

At operation 630 the image processing apparatus encrypts and stores the decrypted content data. In this case, an algorithm for the encryption is the same as the encryption algorithm for the content data received by the image processing apparatus in the operation 610.

At operation 640 the image processing apparatus determines the location corresponding to the determined index frame from the encrypted content data.

At operation 650 the image processing apparatus generates and stores the index information that involves the information about the determined location.

Then, at operation 660 the image processing apparatus receives a user's input about the trick play.

At operation 670 the image processing apparatus retrieves information about an index frame of a scene indicated by a user's input from the index information. For example, with regard to the scene of the content moved in response to a user's input, the image processing apparatus acquires identifier (ID) of the index frame of the corresponding scene, and information about a data location corresponding to the ID within the encrypted content data, from the index information.

At operation 680 the image processing apparatus acquires data in accordance with information retrieved from the encrypted content data.

At operation 690 the image processing apparatus processes the acquired data to display an image.

Below, the index information will be described in more detail.

Figure 7:
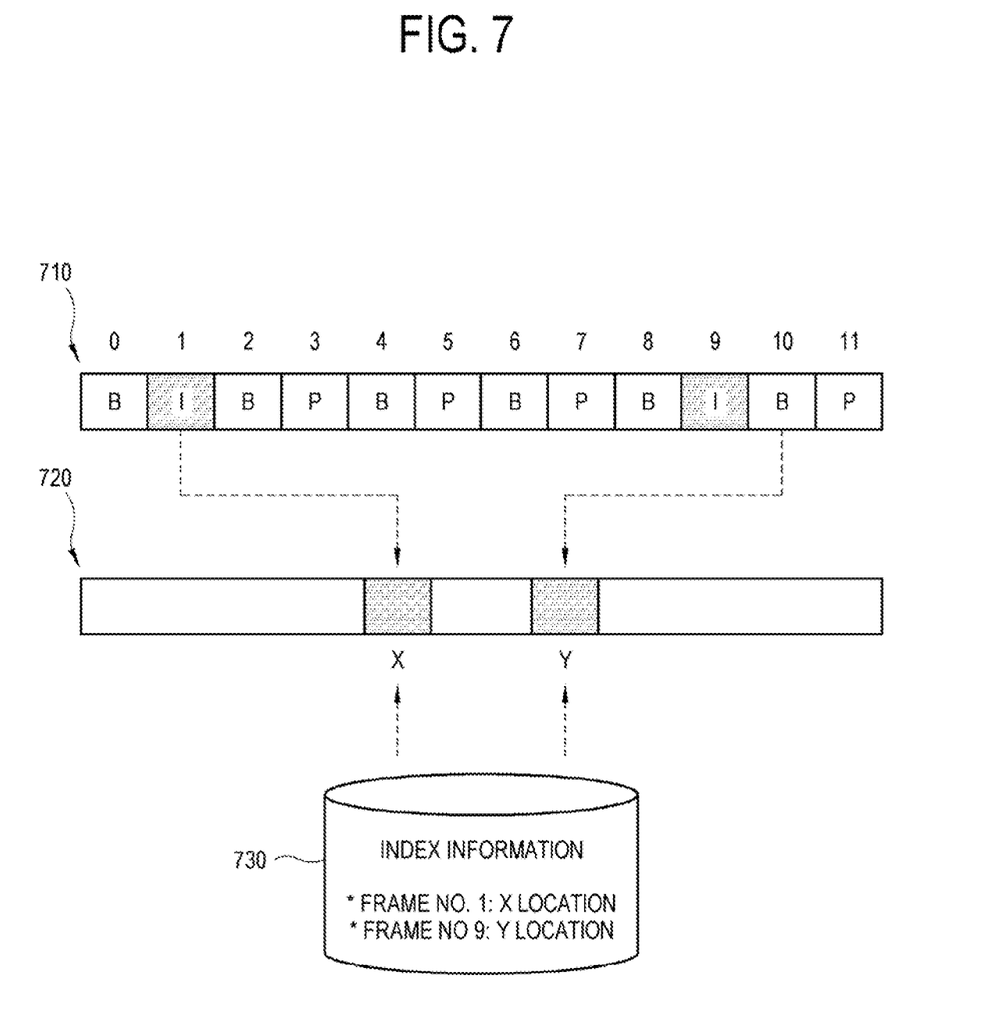
FIG. 7 illustrates an example of a schematic principle that an image processing apparatus according to one exemplary embodiment generates index information to be referred.

FIG. 7 illustrates an example of a schematic principle that an image processing apparatus according to one exemplary embodiment generates index information to be referred.

As shown in FIG. 7, decrypted content data 710 includes a plurality of image frames arranged in time sequence when the decrypted content data 710 is an image signal. When the image signal complies with moving picture experts group (MPEG) standards, encoding compression for the image signal is performed based on a bi-directional prediction of the past and the future, i.e. both forward and backward directions. The image signal is subjected to a compression algorithm based on discrete cosine transform (DCT), image segmentation for segmenting an image into some pixels, motion estimation and compensation, etc. In particular, each image frame of the image signal has one among three attributes of an intra-picture (I-picture), a uni-directionally predicted picture (P-picture), and a bi-directionally predictive picture (B-picture) based on a time prediction and interpolation.

The I-picture or I-frame refers to a reference frame for decoding between the image frames. The I-frame is a screen to be encoded from a corresponding image frame solely, i.e. a reference frame to which a prediction between frames is not applied. The I-frame may be given at any location of the image signal, and used for an arbitrary access to the data.

The P-picture or P-frame refers to a prediction screen between forward frames. The P-frame is generated from a prediction between a previous I-frame and another previous P-frame. The P-frame is based on a principle that successive images are caused by not change of the whole image but lateral movement of image blocks. In other words, when there is a motion, an object on a screen generally has lateral movement rather than great change in the shape of the object. Thus, only a very small difference between a previous screen and a current screen is encoded.

The B-picture or B-frame refers to a prediction screen between bidirectional frames. To compress the B-frame, previous and later I-frames and P-frames are all used. When the B-frame is used, compressibility is high.

The encoded image signal is decoded by performing the prediction between the forward frames and the prediction between the bidirectional frames with respect to the I-frame.

Here, when a searching operation for a content image is performed like a trick play, the I-frame is generally used among the I-frame, the P-frame, and the B-frame. This is because an arbitrary access to the data is possible as the I-frame is encodable solely without a prediction between other frames. Such concept of the I-frame is similarly applied to other standards, for example, H.264 standards, as well as the MPEG standards.

Therefore, only the location of the I-frame within the image signal is needed for the trick play, and the I-frame is used as the key frame or the index frame for the criterion of the trick play.

Meanwhile, the attributes of the image frame are easily determined when the image signal is not encrypted, i.e. the clean image signal is given. However, when the image signal is encrypted, it is impossible to determine what image frame is the I-frame corresponding to a predetermined scene or a predetermined point in time. In this regard, the image processing apparatus according to an exemplary embodiment generates index information 730 as follows.

When is received from the source device, the image processing apparatus decrypts the encrypted content data into the clean content data 710. For example, the decrypted content data 710 includes twelve image frames, and the image frames of No. 1 and No. 9 have the attributes of the I-frame. Information about such attributes are contained in a header of each image frame of the clean content data 710, and therefore the image processing apparatus checks the content in each header to thereby determine what image frame has the attributes of the I-frame.

To store the decrypted content data 710, the image processing apparatus converts the decrypted content data 710 into encrypted content data 720 by the encryption algorithm of the source device. In this case, the image processing apparatus generates the index information 730 showing a data location X of the image frame No. 1 and a data location Y of the image frame No. 9 which have the attributes of the I-frame.

That is, the index information 730 includes the ID or index number of the image frame having the attributes of the I-frame within the encrypted content data 720, and information for identifying the data location of each image frame ID. The identification information of the data location may for example indicate a code of a specific section among a series of data codes. Further, the index information 730 includes information about a play point in time corresponding to each image frame, within a total play time of content.

Unlike the clean content data 710, the image processing apparatus cannot check content in the header of the encrypted content data 720. However, according to an exemplary embodiment, the image processing apparatus can determine the data of the image frame, which has the attributes of the I-frame, within the encrypted content data 720 by referring to the index information 730.

When a user's input corresponding to a trick play is received under a condition that the encrypted content data 720 and the index information 730 are stored, the image processing apparatus retrieves the ID of the image frame corresponding to the scene of the content indicated by a user's input, and the data location of the corresponding ID from the index information 730. The image processing apparatus extracts data from the encrypted content data 720 on the basis of the retrieved information, and performs decryption and decoding processes to thereby display an image based on the data.

Like this, the image processing apparatus generates the index information 730 corresponding to the encrypted content data 720, and performs the trick play operation based on the index information 730.

Meanwhile, the foregoing embodiments show that all operations are performed in the image processing apparatus. However, the image processing apparatus may be used not only independently, but also under an environment of Internet of things (IOT). Below, it will be described that the present inventive concept is applied to a network system such as a home network.

Figure 8:
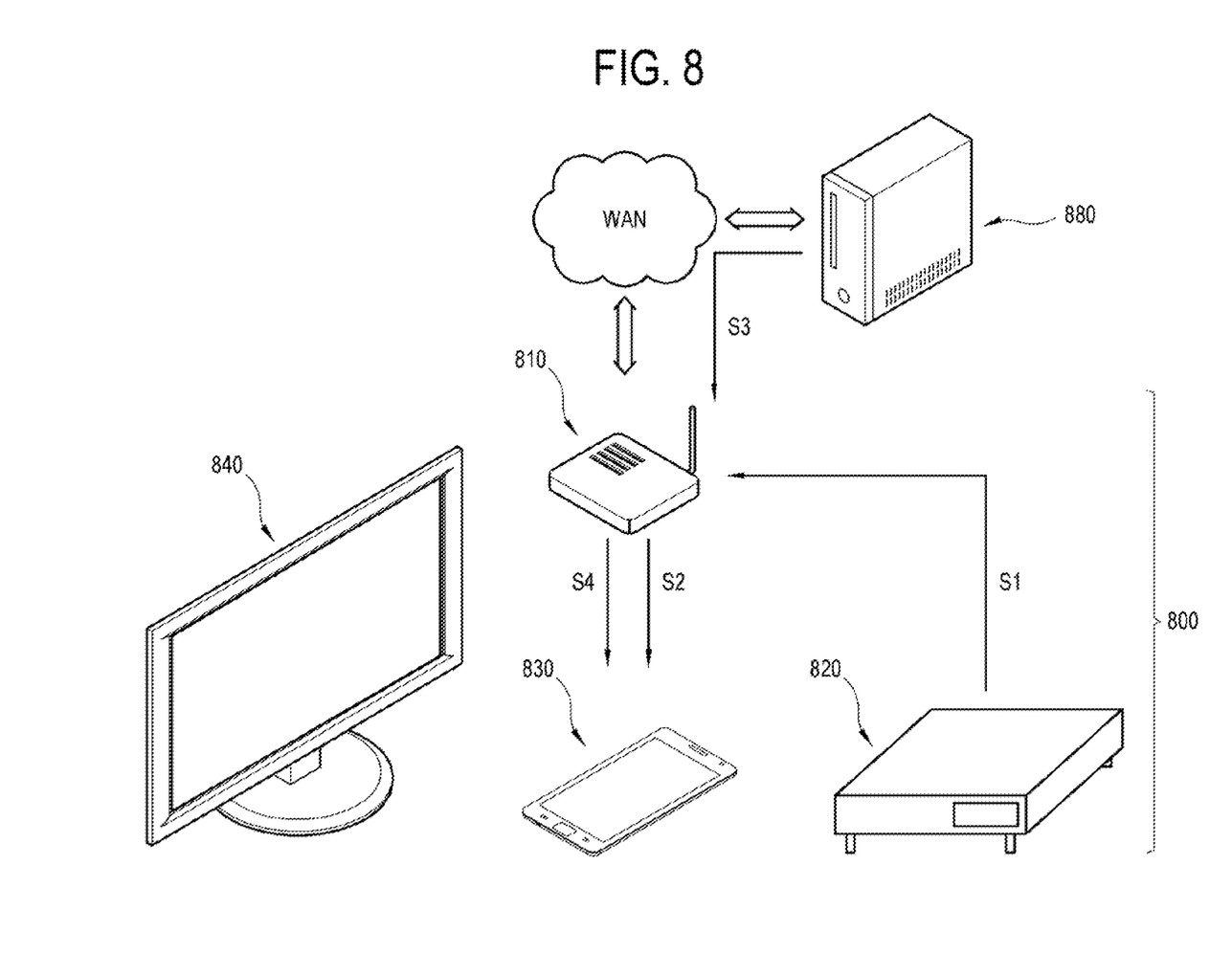
FIG. 8 illustrates an example of a network system according to one exemplary embodiment.

FIG. 8 illustrates an example of a network system according to one exemplary embodiment.

As shown in FIG. 8, a system 800 according to this exemplary embodiment establishes a network that includes one or more host apparatuses 810, and one or more electronic apparatuses 820, 830 and 840. The system 800 in this exemplary embodiment includes one host apparatus 810 and a plurality of electronic apparatuses 820, 830 and 840, but the number or kinds of host apparatus 810 or the electronic apparatuses 820, 830 and 840 are not limited to the specific embodiment. The network system 800 may be achieved by a closed network that adopts a preset security policy to selectively block accesses from other apparatuses outside the system 800, and may connect with a wide area network to communicate with a server 880. As an example of the system 800, there is a home or local network for home or office.

When the system 800 is achieved by the closed network, only the electronic apparatuses 820, 830 and 840 authenticated by the system 800 are allowed to have an access to the host apparatus 810 used for a communication relay in the system 800. For example, when the electronic apparatuses 820, 830 and 840 try having an access to the wide area network via the host apparatus 810, the electronic apparatuses 820, 830 and 840 have to pass security authentication designated in the host apparatus 810. When the host apparatus 810 is materialized by an access point (AP), the host apparatus 810 stores service set identifier (SSID) and a password. The electronic apparatuses 820, 830 and 840 search for the host apparatus 810 on the basis of the SSID, and transmit a password to the searched host apparatus 810 so as to be authenticated for accessing the host apparatus 810.

The host apparatus 810 may be materialized by various kinds of communication apparatuses such as a gateway, a router, an IoT hub, and the like for the communication relay as well as the AP. Further, authentication information for accessing the host apparatus 810 include various pieces of network information and ID information, such as the device ID of the host apparatus 810, the communication ID of the host apparatus 810, an authentication password for accessing the host apparatus 810, etc.

The electronic apparatuses 820, 830 and 840 may include not only a set-top box 820, a mobile apparatus 830 and a TV 840 which are illustrated in FIG. 8, but also various kinds of apparatuses such as home appliances, a wearable device, a computer, etc.

Under such a system environment, an image processing apparatus 820 may transmit or stream encrypted content data to an external apparatus 830. The image processing apparatus 820 stores the encrypted content data, index information, and a key address DB for a decryption process. The image processing apparatus 820 in this embodiment is substantially the same as the image processing apparatus described in the foregoing exemplary embodiments, and therefore detailed descriptions thereof will be avoided.

The image processing apparatus 820 transmits the previously stored encrypted content data, index information, key address DB to the host apparatus 810 (S1). These pieces of data are transmitted to the external apparatus 830 by the relay of the host apparatus 810 (S2). That is, the image processing apparatus 820 serves as a streaming server for streaming the encrypted content data in the system 800. In this case, the encrypted content data streamed from the image processing apparatus 820 complies with the same encryption algorithm as the encryption algorithm for the encrypted content data that the image processing apparatus 820 first receives from the source device, and therefore does not violate the security policy of the content provider.

The external apparatus 830 displays an image by processing the encrypted content data streamed from the image processing apparatus 820. In this case, the trick play to be implemented in the external apparatus 830 may be performed by referring to the index information transmitted from the image processing apparatus 820, and its detailed operations are based on the same principle as that of the trick play operations of the foregoing exemplary embodiments.

The external apparatus 830 decrypts the encrypted content data based on the key address DB. For example, when the server 880 is materialized by a key server, the external apparatus 830 accesses the server 880 in accordance with address information recorded in the key address DB. The server 880 accepts the access when the external apparatus 830 is allowed in terms of security, and the decryption key corresponding to the request of the server 880 is transmitted to the host apparatus 810 (S3). This key is transmitted from the host apparatus 810 to the external apparatus 830 (S4). The external apparatus 830 decrypts the encrypted content data with the key received from the server 880.

When the server 880 receives a key request from the external apparatus 830, it is determined whether the external apparatus 830 is allowed or not in terms of security. There are many determination methods. For example, the server 880 receives the ID of the external apparatus 830 from the external apparatus 830, and accepts the access of the external apparatus 830 when the received ID matches the registered ID or blocks the access of the external apparatus 830 when the received ID does not match the registered ID. The ID of the external apparatus 830 may include ID of the processor of the external apparatus 830, a media access control (MAC) address of the communicator of the external apparatus 830, account information of a user of the external apparatus 830, or various pieces of unique information for distinguishing other external apparatuses 830.

Meanwhile, the foregoing exemplary embodiment shows a case that the image processing apparatus records the content data received from the source device, and autonomously stores the recorded content data therein. However, under an IoT environment, the image processing apparatus may store content data recorded by another apparatus, and such an exemplary embodiment will be described below.

Figure 9:
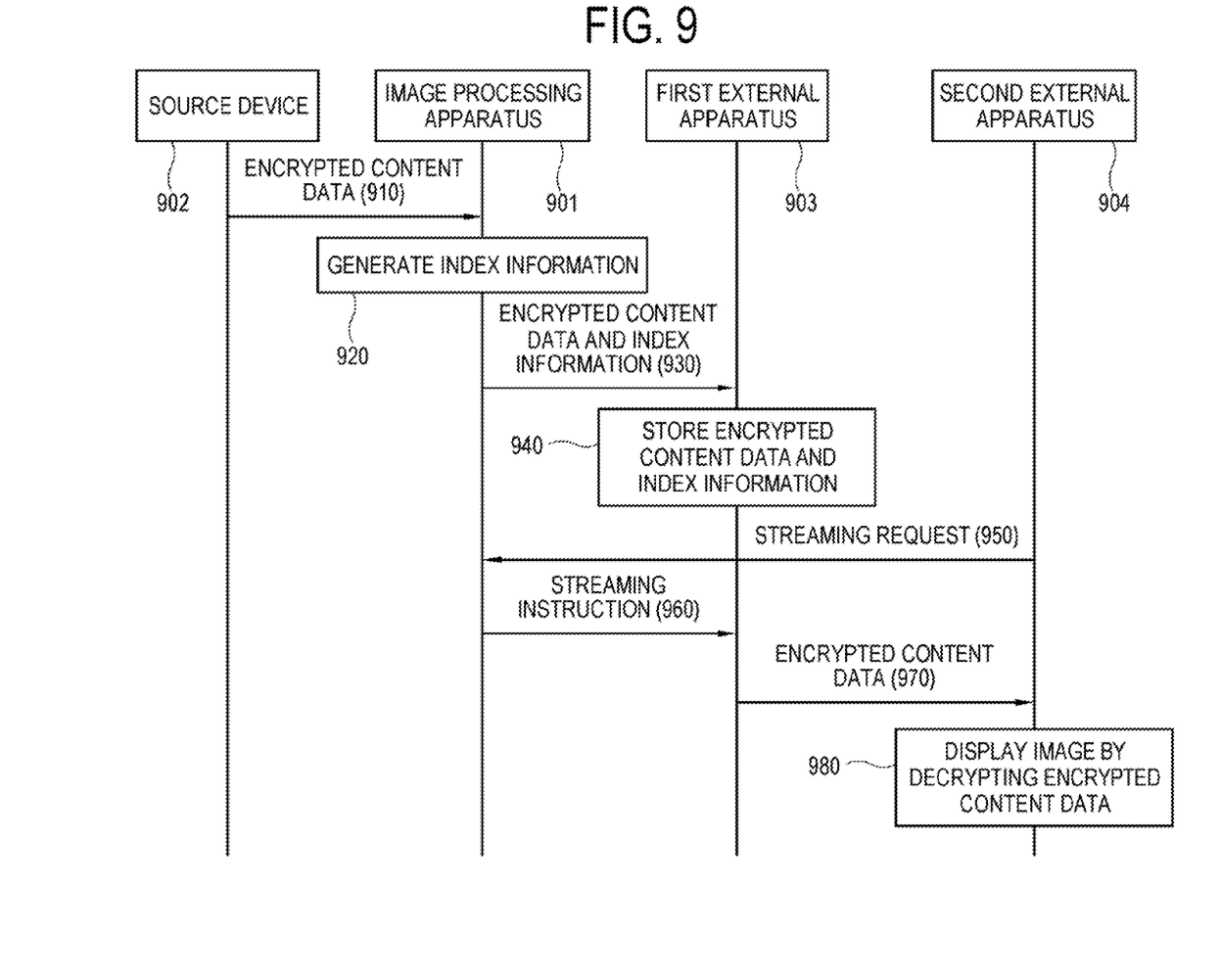
FIG. 9 illustrates an example that an image processing apparatus according to one exemplary embodiment processes encrypted content data to be stored in a first external apparatus and streamed to a second external apparatus.

FIG. 9 illustrates an example that an image processing apparatus according to one exemplary embodiment processes encrypted content data to be stored in a first external apparatus and streamed to a second external apparatus.

As shown in FIG. 9, the image processing apparatus 901 receives encrypted content data from the source device 902 (910). The image processing apparatus 901 decrypts the encrypted content data, and analyzes the decrypted content data, thereby generating index information corresponding to the encrypted content data (920). The image processing apparatus 901 encrypts the decrypted content data again, and transmits the encrypted content data and the index information to a first external apparatus 903 (930).

The first external apparatus 903 stores the encrypted content data and the index information which are received from the image processing apparatus 901 (940).

The image processing apparatus 901 receives a control signal making a content-streaming request from a second external apparatus 904 (950). In response to the request, the image processing apparatus 901 transmits a control signal for a streaming instruction to the first external apparatus 903 in which the encrypted content data is stored (960).

In response to the instruction from the image processing apparatus 901, the first external apparatus 903 streams the encrypted content data to the second external apparatus 904 (970). The second external apparatus 904 decrypts the received encrypted content data and displays a content image (980).

For a trick play operation, the second external apparatus 904 may additionally receive the index information from the first external apparatus 903. Alternatively, the second external apparatus 904 may make the streaming request (950) to not the image processing apparatus but the first external apparatus 903, and the first external apparatus 903 may perform streaming in response to the streaming request.

Further, the image processing apparatus 901 may determine whether the second external apparatus 904 is allowable in terms of security in response to the streaming request (950), and do not make the streaming instruction (960) when it is determined that the second external apparatus 904 is not allowed.

The methods according to the foregoing exemplary embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a volatile or nonvolatile storage such as a ROM or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specially designed and configured according to the exemplary embodiments, or may be publicly known and available to those skilled in the art of computer software.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus comprising:
   a memory;
   a receiver configured to receive a transport stream including encrypted content data of a content from a source device; and a processor configured to:
  decrypt the encrypted content data obtained from the transport stream,
  obtain unencrypted index information based on the decrypted content data, wherein the unencrypted index information includes information indicating at least one location of data of at least one image frame corresponding to a respective scene of the content within the encrypted content data from the transport stream, and includes information about a play point in time corresponding to the respective image frame within a total play time of the content,
  obtain the encrypted content data from the transport stream in association with the unencrypted index information,
  in response to a user input for performing a function corresponding to a trick play being received, identify at least one location of data of at least one image frame of the respective scene indicated by the user input, within the encrypted content data, based on the unencrypted index information,
  decrypt the data of the identified location from the encrypted content data, and
  process the decrypted data to display an image.

2. The image processing apparatus according to claim 1, wherein the at least one reference included in the unencrypted index information indicates the at least one location of the obtained encrypted content data from the transport stream corresponding to a scene requested to be displayed by a searching operation related to the content data.

3. The image processing apparatus according to claim 2, wherein
  the at least one reference included in the unencrypted index information includes identification information of an index frame of the scene, the index frame having a preset attribute among a plurality of image frames, and
  the processor retrieves location information of the at least one location of the scene in the obtained encrypted content data from the transport stream corresponding to the index frame, and processes data corresponding to the retrieved location information to be displayable.

4. The image processing apparatus according to claim 3, wherein the preset attribute of the index frame includes an Intra-picture image frame.

5. The image processing apparatus according to claim 3, wherein the processor obtains data corresponding to the retrieved location information by identifying a data code corresponding to the identification information of the index frame among data codes of the obtained encrypted content data from the transport stream.

6. The image processing apparatus according to claim 1, wherein the processor re-encrypts the decrypted content data with an encryption algorithm applied to the content data by the source device when the transport stream is generated, and stores the re-encrypted content data in the memory.

7. The image processing apparatus according to claim 1, further comprising:
  a communicator configured to communicate with a server that stores a plurality of keys given for respectively decrypting data corresponding to a plurality of sections of the encrypted content data from the transport stream,
  wherein the processor obtains a key corresponding to decryption for a section among the plurality of sections of the encrypted content data from the server, based on information about an address in which the plurality of keys are stored.

8. The image processing apparatus according to claim 7, wherein the processor causes the information about the address and the encrypted content data stored from the transport stream in the memory be transmitted to an external apparatus through the communicator so that the image is displayable by the external apparatus.

9. A method of controlling an image processing apparatus, the method comprising:
  receiving a transport stream including encrypted content data of a content from a source device;
  decrypting the encrypted content data;
  obtaining unencrypted index information based on the decrypted content data, wherein the unencrypted index information includes information indicating at least one location of data of at least one image frame corresponding to a respective scene of the content within the encrypted content data from the transport stream, and includes information about a play point in time corresponding to the respective image frame within a total play time of the content;
  obtaining the encrypted content data from the transport stream in association with the unencrypted index information,
  in response to a user input for performing a function corresponding to a trick play being received, identifying at least one location of data of at least one image frame of the respective scene indicated by the user input, within the encrypted content data, based on the unencrypted index information,
  decrypting the data of the identified location from the encrypted content data, and
  processing the decrypted data to display an image.

10. The method according to claim 9, wherein the at least one reference included in the unencrypted index information indicates the at least one location of the encrypted content data from the transport stream corresponding to a scene requested to be displayed by a searching operation related to the content data.

11. The method according to claim 10, wherein
  the at least one reference included in the unencrypted index information includes identification information of an index frame of the scene, the index frame having a preset attribute among a plurality of image frames, and
  the method further includes:
    retrieving location information of the at least one location of the scene in the encrypted content data from the transport stream corresponding to the index frame, and
    processing data corresponding to the retrieved location information to be displayable.

12. The method according to claim 11, wherein the preset attribute of the index frame includes an Intra-picture image frame.

13. The method according to claim 11, wherein the processing of the data corresponding to the retrieved location information to be displayable includes obtaining data corresponding to the retrieved location information by identifying a data code corresponding to the identification information of the index frame among data codes of the stored encrypted content data from the transport stream.

14. The method according to claim 9, wherein the storing of the encrypted content data and the unencrypted index information comprises re-encrypting the decrypted content data with an encryption algorithm applied to the content data by a source device when the transport stream is generated, and storing the encrypted content data.

15. The method according to claim 9, further comprising:
communicating with a server that stores a plurality of keys given for respectively decrypting data corresponding to a plurality of sections of the encrypted content data from the transport stream, and
obtaining a key corresponding to decryption for a section among the plurality of sections of the encrypted content data from the server, based on information about an address in which the plurality of keys are stored.

16. The method according to claim 15, further comprising:
transmitting the information about the stored encrypted content data and the address information to an external apparatus through the communicator so that the image is displayable by the external apparatus.

17. A nonvolatile computer-readable recording medium storing a program which when executed by a processor of an image processing apparatus executes an operation, the operation comprising:
receiving a transport stream including encrypted content data of a content from a source device;
decrypting the encrypted content data;
obtaining unencrypted index information based on the decrypted content data, wherein the unencrypted index information includes information indicating at least one location of data of at least one image frame corresponding to a respective scene of the content within the encrypted content data from the transport stream, and includes information about a play point in time corresponding to the respective image frame within a total play time of the content;
obtaining the encrypted content data from the transport stream in association with the unencrypted index information;
in response to a user input for performing a function corresponding to a trick play being received, identifying at least one location of data of at least image frame of the respective scene indicated by the use input, within the encrypted content data, based on the unencrypted index information,
decrypting the data of the identified location from the encrypted content data, and
processing the decrypted data to display an image.

18. The nonvolatile computer-readable recording medium according to claim 17, wherein displayability of the image of the content data is controlled according to the encrypted content data from the transport stream stored in association with the unencrypted index information.

19. The nonvolatile computer-readable recording medium according to claim 18, wherein the displayability of the image of the content data that is controlled according to the encrypted content data from the transport stream stored in association with the unencrypted index information meets a security policy assigned to the content data by a source device.

20. The nonvolatile computer-readable recording medium according to claim 17, wherein each subsequent redisplaying of the image of the content data is controlled according to the encrypted content data from the transport stream stored in association with the unencrypted index information.

* * * * *